No. 671,125. Patented Apr. 2, 1901.
W. LE G. BUNDY.
TIME RECORDER.
(Application filed Nov. 26, 1898.)

(No Model.) 6 Sheets—Sheet 1.

Fig. 1,

WITNESSES:

INVENTOR

BY

ATTORNEYS

No. 671,125.  
W. LE G. BUNDY.  
TIME RECORDER.  
(Application filed Nov. 28, 1898.)  
(No Model.)

Patented Apr. 2, 1901.

WITNESSES:  
Jas. C. Howell  
Geo. W. Mills Jr.

INVENTOR  
Willard Le Grand Bundy  
BY  
Witter & Kenyon  
ATTORNEYS

No. 671,125.

W. LE G. BUNDY.
TIME RECORDER.
(Application filed Nov. 26, 1898.)

(No Model.)

Patented Apr. 2, 1901.

WITNESSES:
Jas. C. Howell
Geo. W. Tibbs Jr.

INVENTOR
Willard Le Grand Bundy
BY
Witter & Kenyon
ATTORNEYS

No. 671,125. Patented Apr. 2, 1901.
W. LE G. BUNDY.
TIME RECORDER.
(Application filed Nov. 26, 1898.)
(No Model.) 6 Sheets—Sheet 4.

*Fig. 4.*

WITNESSES:

INVENTOR
Willard Le Grand Bundy
BY
Witter & Kenyon
ATTORNEYS

No. 671,125.　　　　　　　　　　　　　　　　Patented Apr. 2, 1901.
W. LE G. BUNDY.
TIME RECORDER.
(Application filed Nov. 26, 1898.)

(No Model.)　　　　　　　　　　　　　　　　　　6 Sheets—Sheet 6.

WITNESSES:　　　　　　　　　　　　　　　　INVENTOR
Jas. C. Howell　　　　　　　　　　　Willard Le Grand Bundy
　　　　　　　　　　　　　　　　　　　　　　BY
　　　　　　　　　　　　　　　　　　　Witter & Kenyon
　　　　　　　　　　　　　　　　　　　　　ATTORNEYS

United States Patent Office.

WILLARD LE GRAND BUNDY, OF BINGHAMTON, NEW YORK, ASSIGNOR TO THE BUNDY MANUFACTURING COMPANY, OF NEW YORK.

TIME-RECORDER.

SPECIFICATION forming part of Letters Patent No. 671,125, dated April 2, 1901.

Application filed November 26, 1898. Serial No. 697,543. (No model.)

*To all whom it may concern:*

Be it known that I, WILLARD LE GRAND BUNDY, of Binghamton, Broome county, State of New York, have invented a new and useful Improvement in Time-Recorders, of which the following is a specification.

My invention relates to time-recorders.

It has for its object to produce a time-recorder for automatically recording the times of arrival and departure of employees, simple and compact in construction, efficient in operation, adapted to be easily manipulated, with improved impression mechanism and paper-feeding mechanism, and in its preferred form autographic in character, in which the recording-strip is normally concealed and is exposed only by the operation of the recorder by an employee, during the early part of which operation the correct time is printed upon a recording-strip before the autograph of the employee can be inscribed upon the strip.

It consists of the devices herein shown and described.

Heretofore in autographic time-recorders, in which type upon time-recording wheels representing the hours and minutes are arranged to print the time upon a recording-strip opposite to the signatures of employees, it has been usual to have an opening in the casing through which the employee could write upon the recording-strip, and to then require of the employee some other act, such as the turning of a crank or the operation of some other suitable device for actuating the impression and feeding mechanisms to cause the time to be printed upon the recording-strip opposite the written name. In such machines the opening is exposed, and employees can write their names upon the recording-strip without turning a crank or other similar device, and thus either through forgetfulness or intention fail to record the time upon the paper strip opposite to their names. In my improved device the opening is normally covered or concealed. Before an employee can write his name upon the recording-strip he must remove the cover, and in the act of so doing he puts into operation impression mechanism which prints the correct time upon the recording-strip as the cover is being removed and before the employee has an opportunity to write his name upon the strip. The correct time of arrival and departure of such employee is thus always noted.

In my improved device in its preferred form a movable carriage carries the time-recording wheels, recording-strip, inking-ribbon, and connecting parts. This carriage is moved by means operated by the employee or workman, preferably by removing a cover, so as to bring in some part of the movement of the carriage, preferably during the early part, the recording-strip and time-recording wheels into contact to cause an impression of the time to be made upon the recording-strip. In some part of the movement of the carriage the recording-strip and inking-ribbon are also fed forward, so as to bring them into proper position for the next operation of the machine. The carriage and the time-recording wheels and other connections constitute impression mechanism for causing the time to be printed upon the recording-strip.

In the drawings that form part of this specification, in which like reference-characters designate like parts in the several figures, I have shown and will now proceed to describe the preferred form of my improved device.

Fig. 8 of the arm-stop 41, hereinafter described.

The casing containing the mechanism is shown integral with a clock-casing, the clock-face 1 appearing in the upper part of the casing. Below the clock-face a part 2 of the casing slants outward, making a table that slopes upward from front of the casing at an angle of about thirty degrees. Through an opening or slot 3 in this table appears a portion of a recording-strip 4, preferably of paper, which at this point passes over a support 5. A cover ordinarily covers and conceals the slot, preventing the workman from writing his name upon the recording-strip until he first removes the cover. This cover may be of any form and may be removed in any suitable manner. In the drawings I have shown it as a lid 6, pivotally secured to the table, and it is removed from the opening by the workman raising it into the position shown in Fig. 1. In thus raising the lid to expose the opening the workman first actuates impression mechanism, which causes the time to be printed upon the recording-strip in a manner presently to be described.

Figure 5:
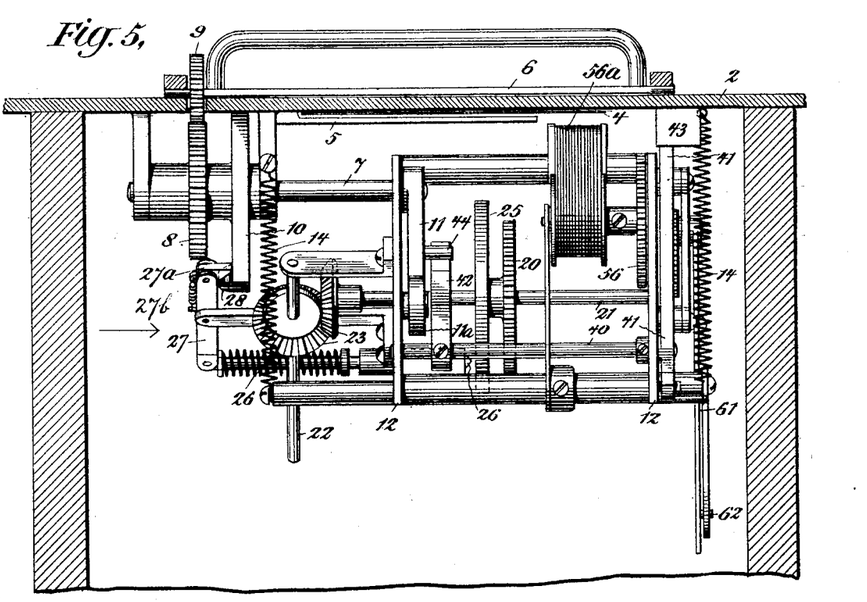
Fig. 5 is a vertical section taken at right angles to the section of Fig. 3, the type-wheels being omitted for the sake of clearness.

The parts directly attached to the table 2 are as follows: A shaft 7 (see Fig. 5) is journaled in lugs depending from the under side of the table. Upon it is keyed a gear-wheel 8, which meshes with gear-wheel 9, mounted on the pivot which secures the cover to the table and moving when the lid is moved. Thus when the lid is raised through gear-wheels 9 and 8 shaft 7 is rotated. Secured to shaft 7 are cams 10 and 11. Cam 11 is shaped as shown in full lines in Fig. 6, with two shoulders 11$^b$ and an intervening and depressed portion between the two shoulders and bears against roller 11$^a$, mounted on the carriage hereinafter described. As the lid 6 is raised and lowered, cam 11 oscillates forward and backward, so that roller 11$^a$ registers alternately with a shoulder and the depression. When roller 11$^a$ registers with one or the other of the shoulders, the cam acts as a stop to hold the carriage away from table 2 and the printing position; but when roller 11$^a$ registers with the depression the stop is removed and the carriage is permitted to rise, forcing the time-recording wheels and recording-strip into contact in the manner presently to be described.

I will now describe the carriage A and the time-recording wheels that it contains.

One end of a carriage A, composed of side plates 12 and rods 12$^a$ connecting them, is pivoted at 13 to lugs secured to the table, and the other end is pressed upward against the under side of the table by springs 14. A horizontal shaft 15 is mounted centrally in the carriage and carries the time-recording wheels, which are composed of an hour and minute wheels 16 and 17. These wheels, which are mounted side by side and move independently of each other, carry on their peripheries type 18, representing, respectively, minutes and hours. They are actuated by a clock-movement in the following manner: Minute-wheel 17, Fig. 4, has on the same sleeve with it a gear-wheel 19, meshing with gear-wheel 20 on shaft 21, mounted in the carriage. This shaft is rotated by shaft 22, mounted in the carriage through bevel-gears 23. To shaft 22 is coupled a flexible shaft 24, Fig. 7, made, preferably, of steel wire in a spiral coil. This shaft is not only flexible, but is torsionally elastic. It is led upward to the clock-movement and there coupled with one of the clock-shafts, whose speed is such that through gears 23, 20, and 19 minute-wheel 17 is driven at the desired speed. The type are spaced upon the periphery of the minute-wheel in accordance with its speed, so that a new type character comes uppermost, preferably, every two minutes.

Figures 3, 10:
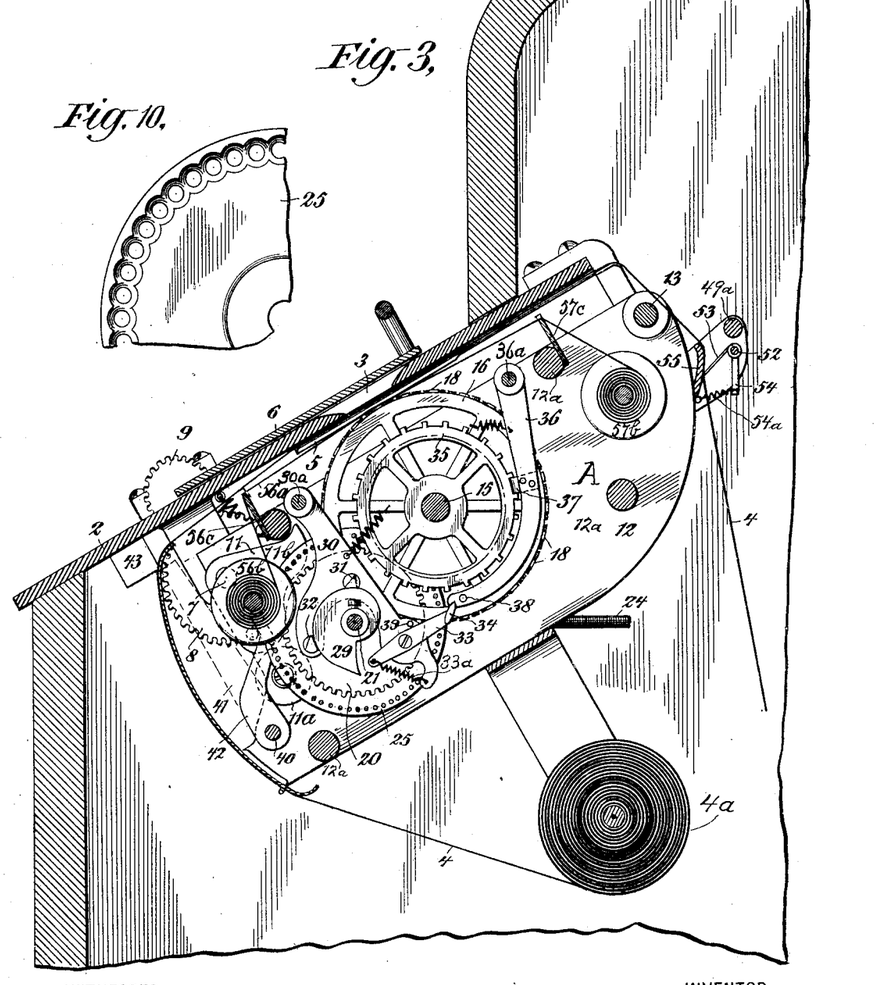
Fig. 3 is a transverse vertical section of said mechanism on lines 3 3 of Fig. 4 viewed as shown by the arrow.
Figs. 9 and 10 are enlarged detail views of certain parts of the device for locking the minute-wheel.
Figure 4:
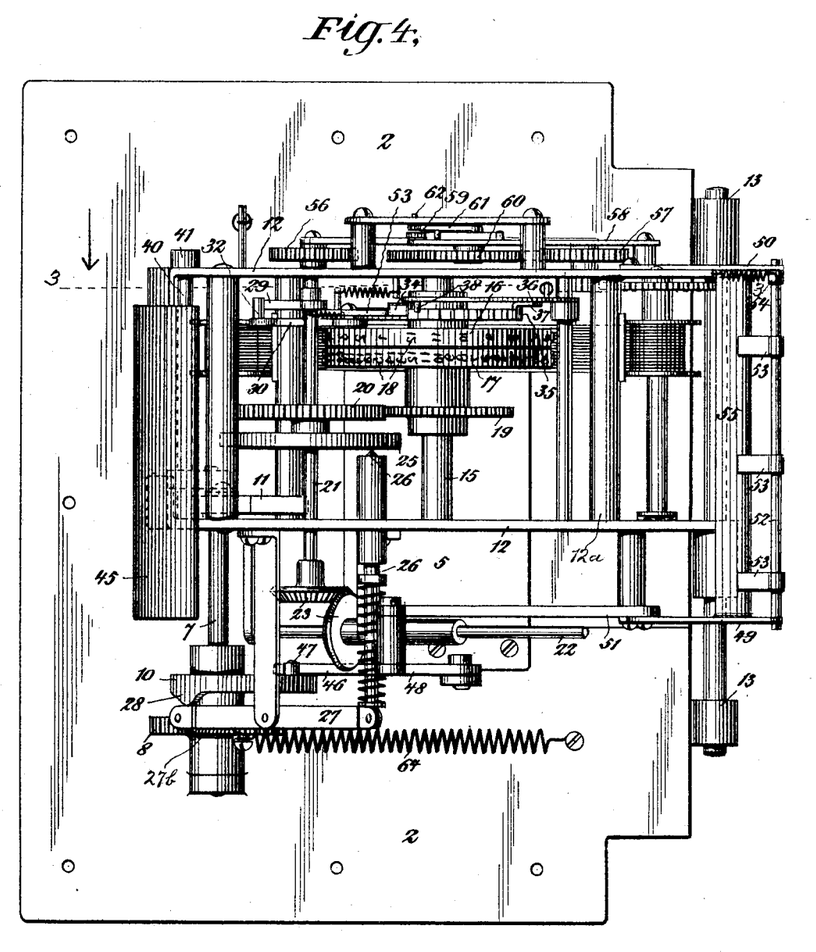
Fig. 4 is a plan of the under side of said mechanism.

In order to hold the time-wheels perfectly still during the printing and to bring the type of the minute-wheel representing the proper minute exactly upon the printing-line, I provide a device for locking both time-wheels and for adjusting the minute-wheel constructed as follows: On shaft 21, Fig. 4, is a locking-disk 25, which, as shown in Fig. 10, has a row of tapering holes near its circumference, the larger end of each hole cutting slightly into its neighbor on either side, so as to leave a sharp ridge between each hole and the next one. A pin 26, having a tapering point, is sleeved in the lower part of the carriage. (See Fig. 4.) The disk and pin are arranged so that as the disk revolves the larger ends of the holes in turn come opposite to the tapered end of the pin. When the pin is moved toward the disk, its point enters one of the holes and so locks the disk and the minute-wheel. If the pin should advance at a moment when no one of the holes is fairly presented, its point will enter the nearest hole and because of its tapering point will force itself into the hole, thereby rotating the disk slightly in one direction or the other, and thereby adjusting the minute-wheel, so as to move the type nearest to the printing-line, so that it will be exactly upon the printing-line. The torsional flexibility of the shaft 24 is for the purpose of permitting this slight rotation and also the momentary stoppage or detention of the minute-wheel during the printing operation without interfering with the action of the clock-movement. There is one hole in the locking-disk for each type character on the minute-wheel, and the holes are so arranged that when the pin enters any hole one of the type characters on the minute-wheel is in correct position for printing.

Figure 9:
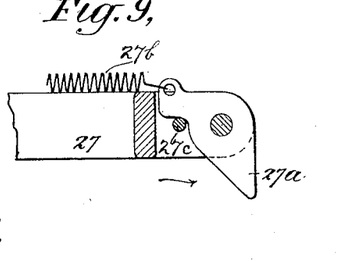

The outer end of pin 26 is pivoted to one end of a lever 27, the pivot passing through a slot (not shown) in the end of the pin, giving some play to the joint. A coiled spring encircling the pin bears against lever 27 at one end and against a shoulder on the pin at the other end, allowing play at the joint only when the resistance of the spring is overcome. This arrangement makes the joint yielding and avoids undue strain upon the parts. The other end of lever 27 carries a pawl 27$^a$, Fig. 7, pivoted at its center, (shown in enlarged detail in Fig. 9,) arranged to be engaged by toe 28 on cam 10. A pin 27$^c$ acts as a stop to the movement of the pawl in one direction, as shown in Fig. 9. When toe 28 passes pawl 27ª in one direction, the pawl held by stop-pin 27ᶜ rides up on toe 28, moving the end of lever 27 and forcing pin 26 into a hole in the disk. When toe 28 passes the pawl in the return motion, the pawl turns back freely out of the way and allows it to pass without moving lever 27. A small coiled spring 27ᵇ then returns the pawl to its proper position.

I employ the following devices to operate hour-wheel 16, Fig. 3. On shaft 21 is a cam 29, and pivoted in the carriage is a reciprocating arm 30, pivoted at 30ª, having a pin 32, which the cam engages in order to reciprocate the arm. Arm 30 is spring-pressed toward the right in Fig. 3 and carries at its lower extremity a dog 33, having a shoulder 34. Hour-wheel 16 has on its periphery preferably two consecutive sets of type characters from "1" to "12," inclusive. Attached to it is a wheel 35, having a tooth for each type character. A locking-arm 36, pivoted at 36ª in the carriage, is spring-pressed toward wheel 35 and carries a lug 37, adapted to enter the successive recesses between the teeth of that wheel, thereby locking that wheel and the hour-wheel 16. The teeth are so arranged that when wheel 35 is locked in its successive positions the successive type characters on hour-wheel 16 are uppermost and in correct position for printing. Arm 36 is extended toward dog 33 and carries at its extremity a pin 38. Arm 30 is driven forward and back with each revolution of cam 29, and dog 33 moves with it. As that dog advances, shoulder 34 passes over pin 38, and thereby depresses arm 36, moving lug 37 out of the recess in wheel 35, and thereby unlocking that wheel. Passing on it engages a tooth of wheel 35 and rotates the wheel one tooth. Wheel 35 is prevented from rotating more than one tooth by pin 31 entering one of its recesses. Returning, shoulder 34 rides below pin 38, and so regains its position without again unlocking wheel 35. A spring 33ª tends to hold against stop-pin 39 on arm 30, the stop-pin 39 holding dog 33 rigid when riding over pin 38, the spring 33ª permitting the dog to give as it rides back under pin 38. Since it has two sets of type characters from "1" to "12," hour-wheel 16 need be rotated only one twenty-fourth of a revolution in order to pass from one number to the next instead of one-twelfth, as would be the case if only one set were used. One of the advantages of using a twenty-four tooth wheel is the use of "A. M." and "P. M."

The recording-strip 4, preferably of paper, is wound upon a roll 4ª on a shaft mounted in a bracket depending from the carriage. The strip passes from the roll to the left, Fig. 2, over a guard 45, and thence over support 5, part of its upper surface being presented through slot 3 to the workman when he raises the lid. Thence the strip passes to the right, over another guard, and down to the feed mechanism now to be described. After passing the feed mechanism it falls into the lower part of the casing.

Figure 7:
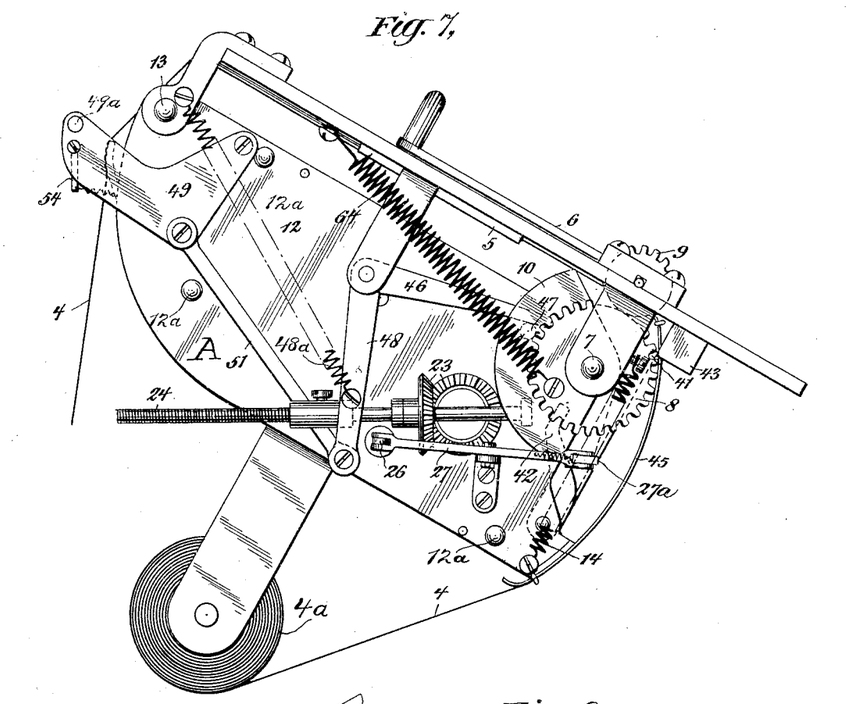
Fig. 7 is a side elevation looking in the direction of the arrow in Fig. 5.

The means for feeding forward the recording-strip are connected to and operated by the cover as it is being closed or replaced in its original position, and consists of the following mechanism: Referring now more particularly to Fig. 7 for the paper-feeding mechanism, a bell-crank lever 46 48 is pivoted in a lug depending from table 2. One arm 46 of this lever is moved by a pin 47, projecting from cam 10 against the pressure of a spring 48ª, attached to the other arm 48. A reciprocating frame is formed of two side plates 49 and 50, pivoted to the carriage and joined by a rod 49ª. Plate 49 is pivotally connected with arm 48 by a link 51, and so through pin 47, arms 46 and 48, and link 51 the paper-feeding frame is made to reciprocate with each forward and backward movement of cam 10. A rock-shaft 52, journaled between the plates 49 and 50, carries three claws 53, placed about equal distances apart, and an arm 54, which by a spring 54ª is made to hold claws 53 yieldingly against a guard 55. The recording-strip 4 passes between the guard and the claws, so that when cam 10 moves from the position shown in Fig. 7 as the workman raises the lid spring 48ª draws arms 48 over through link 51, raising the paper-feeding frame, and claws 53 slide up the paper. As cam 10 returns to its original position through the closing of the lid, pin 47 strikes arm 46 and draws the paper-feeding frame downward, claws 53 biting into the paper and feeding it downward over the guard 55. The feeding forward of the paper strip takes place as the lid is closing, putting the recording-strip in proper position for the next operation of the machine.

Figure 2:
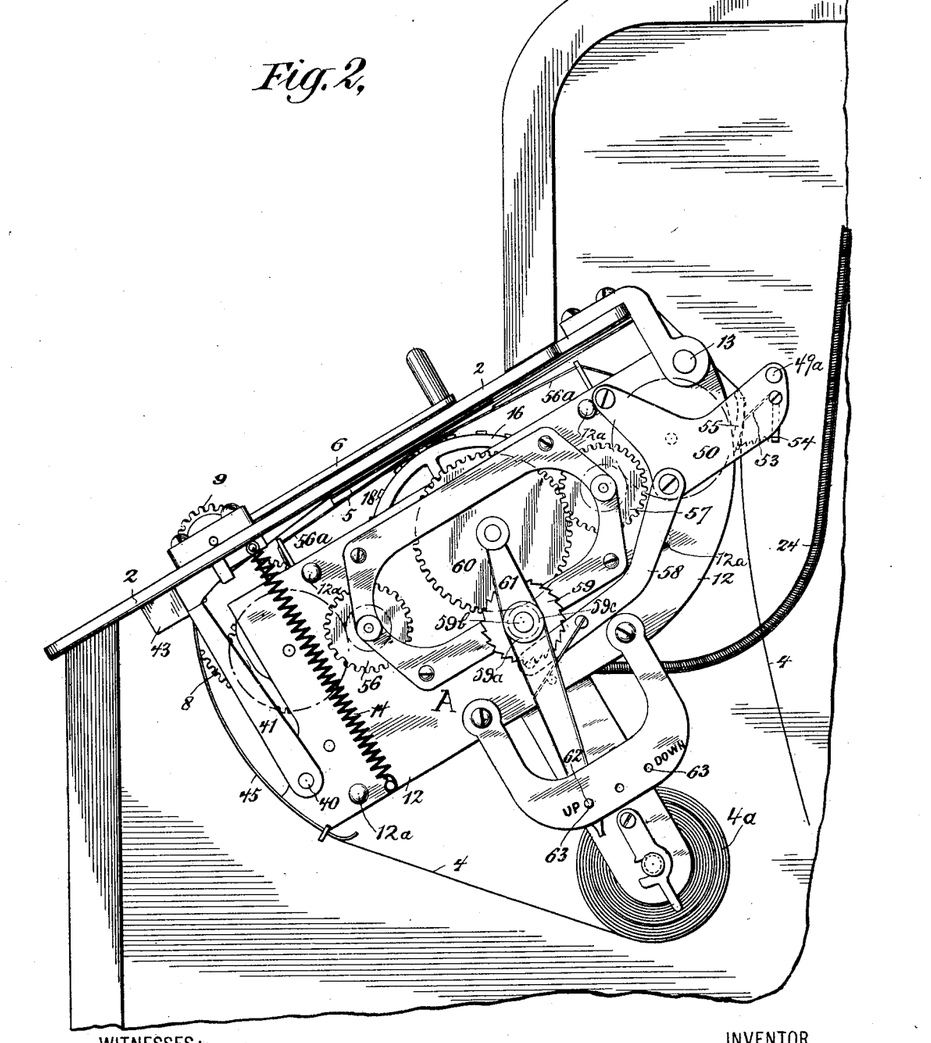
Fig. 2 is a side elevation of the recording mechanism, the side of the casing being removed.

An ink-ribbon 56ª is arranged between the time-recording wheels and the recording-strip. The means for feeding it forward are as follows: Referring particularly to Fig. 3, two spools 56ᵇ and 57ᵇ are journaled in the carriage and are provided with gear-wheels 56 and 57. The ribbon is wound upon one spool, passes up over a guide 56ᶜ, then over the faces of the hour and minute wheels, and then down over another guide 57ᶜ to the other spool. The support 5 is not as wide as the recording-strip, so that one edge of that strip overlies the ribbon and type, as is plainly shown in Fig. 5. The under side of the table at this place serves as a platen. A pawl-arm 58, attached to and driven by the paper-feeding frame, drives a ratchet-wheel 59 upon sleeve 59ª on stud 59ᵇ. Gear 59ᶜ on this same sleeve is geared to a gear-wheel 60 and drives it. This wheel 60 is carried by a lever 61, pivoted centrally with the ratchet-wheel 59 upon stud 59ᵇ, and the lower end of lever 61 carries a pin 62, adapted to be set in either of holes 63 in a bracket attached to the carriage. When the pin is set in one of these holes, gear-wheel 60 engages gear-wheel 56 and winds the ink-ribbon in one direction, and when set in the other hole, as shown in Fig. 2, gear-wheel 60 engages gear-wheel 57 and winds the ink-ribbon in the other direction.

Figure 1:
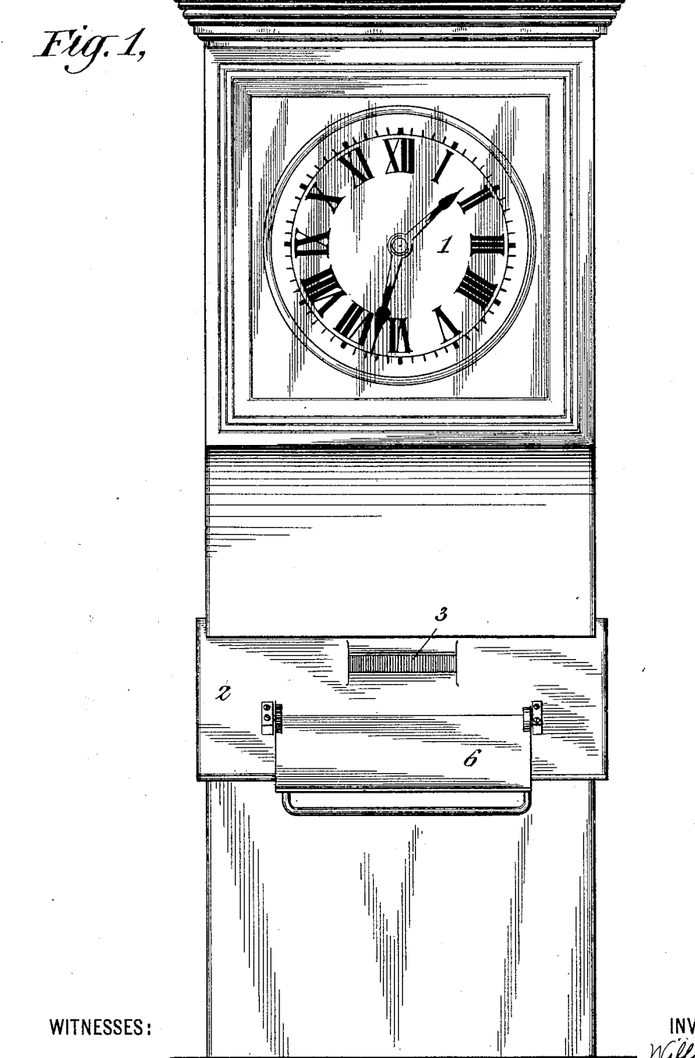
Figure 1 is a front elevation of the casing of a recorder that embodies my invention.
Figure 6:
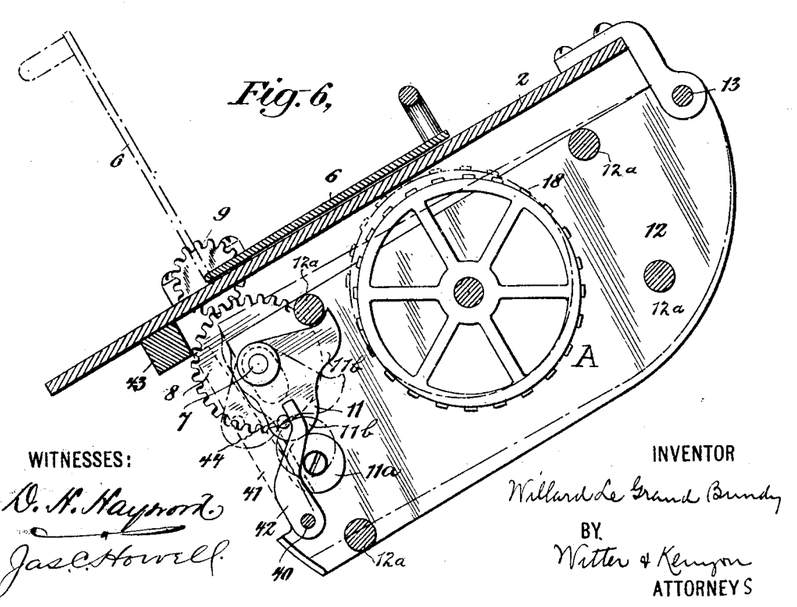
Fig. 6 is a sectional detail of the impression mechanism.
Figure 8:
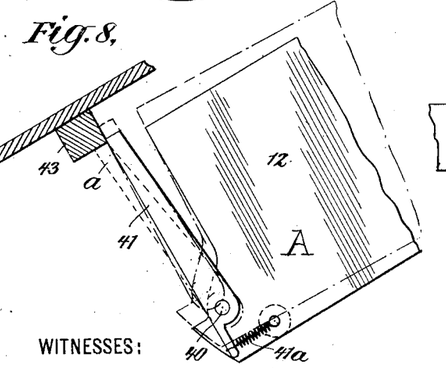

My improved machine in its preferred form is so constructed that in its use a workman will not only raise the lid to the perpendicular position shown in Fig. 6, but, in order to permit him to write through the opening upon the recording-strip, will also pull it still farther forward until it lies in the position shown in Fig. 1. Through this operation cam 11, which while the lid is closed is in the position shown in full lines in Fig. 6, with the left shoulder 11$^b$, as viewed in Fig. 6, of the cam pressing upon roller 11$^a$ and acting as a stop to hold the carriage normally away from the printing position, will be shifted so as to bring the other shoulder 11$^b$ against roller 11$^a$, thus again acting as a stop to keep the carriage away from the printing position. During this transition the stop action of the cam is removed by roller 11$^a$ entering the depression in the cam between the two shoulders, thus releasing the carriage to effect the printing. As the lid closes, the cam of course returns to its normal position; but as this would permit the carriage to again rise through roller 11$^a$ again entering the depression in the cam, thus repeating the printing of the time, I provide a second stop to hold the carriage away from the printing position during the closing of the lid and until the first stop-cam 11 has again resumed its normal position and again become an operative stop, with its left shoulder 11$^b$ again pressing against roller 11$^a$. This second stop is shown in the drawings as stop-arm 41 and is arranged as follows: A rock-shaft 40, Fig. 3, journaled in the lower extremity of the carriage, carries two arms 41 and 42. Arm 41 extends upward from rock-shaft 40 and is so arranged that as the right-hand shoulder 11$^b$ of cam 11 presses roller 11$^a$ and carriage A downward a spring 41$^a$ presses stop-arm 41 to the position marked $a$ in Fig. 8 under projection 43 on the under side of table 2, thereby holding the carriage down from the table away from the printing position against the pressure of springs 14. Arm 42 is adapted to be engaged by a pin 44 on stop-cam 11 as it returns to its normal position and when so engaged to rock shaft 40 against the pressure of spring 41$^a$ (see Fig. 8) and so force stop-arm 41 from under projection 43. This does not take place, however, until the left-hand shoulder 11$^b$ of cam 11 has again made contact with roller 11$^a$. In this way stop 41 prevents a repetition of the printing of the time as the lid is being closed.

The operation is as follows: The workman raises the lid, which is normally held closed by spring 64, Fig. 7, acting through gear-wheels 8 and 9. Through said gear-wheels shaft 7 and with it cams 10 and 11 are rotated in one direction as the lid is raised. As cam 10 moves, pawl-arm 58 rotates ratchet-wheel 59, feeding forward the inking-ribbon, and the paper-feeding frame rises, the claws 53 taking a new hold on the paper. Toe 28 of cam 10 also engages the pawl on lever 27, driving pin 26 into the nearest hole in disk 25, and so setting in correct position for printing the nearest type character of the minute-wheel and locking that wheel during the printing. The raising of the lid also removes stop-cam 11 from its operative position, releasing the carriage to effect the printing. The cover opens toward the workman, and accordingly in order to write his name upon that portion of the paper strip appearing in the slot he is obliged not only to raise the lid to the perpendicular, but also to pull it still farther forward until substantially in the position shown in Fig. 1. When the name is written, the lid is released and is drawn back by spring 64. Cam 11 returns to its first position, but the carriage does not come into contact with the table, because stop-arm 41 holds it down until roller 11$^a$ again bears against cam 11, when pin 44 strikes arm 42, rocks shaft 40, and returns stop-arm 41 to the position shown in full lines in Fig. 8, ready for the next operation. As the lid is being replaced, cam 10 returns to its original position, toe 28 passing pawl 27$^a$ without moving lever 27. Also pin 47, striking arm 46, draws down the paper-feeding frame and claws 53 draw the paper strip down over guard 55, presenting a fresh portion in the slot for the next operation. As the paper-feeding frame moves, pawl-arm 58 moves also and takes a fresh hold on ratchet-wheel 59. The paper strip is thus normally concealed by the cover and can be written upon only after the cover has been raised and the printing of the time effected. This is done during the early part of the operation before the workman has had an opportunity of writing his name. There is accordingly no possibility of error or omission in the record.

By varying the shape or curvature of stop-cam 11 the relative time of the printing by the type of the time-recording wheels upon the recording-strip can be varied and more or less of a blow can be given in effecting this printing. The shape of the stops can of course be widely varied without departing from my invention, and many other changes in the form, construction, and arrangement of other parts of the devices shown in the drawings may similarly be made without departing from the invention. Thus in place of springs 14 any other suitable means can be employed for normally pressing the carriage upward toward the printing position.

My improved time-recorder is simple and compact in construction, efficient and certain in operation, is easily operated, is so constructed that a workman cannot write his name without also printing the correct time, and has improved impression mechanism and paper-feeding mechanism.

What I claim as new, and desire to secure by Letters Patent, is—

1. In a workman's time-recorder, the combination of time-recording wheels actuated by a clock-movement, impression mechanism for causing the time to be printed upon a recording-strip, a casing having an opening through which the workman can write upon the recording-strip, and a movable cover for said opening adapted to be removed by the workman to expose the opening, and means connected to and operated by the cover as it is being removed, for actuating the impression mechanism, whereby the workman can gain access to the recording-strip to write his name thereon only after first printing the time on the recording-strip opposite the place where his name is intended to be written.

2. In a workman's time-recorder, the combination of time-recording wheels, actuated by a clock-movement, impression mechanism for causing the time to be recorded upon the recording-strip, a casing having an opening through which the workman can write upon the recording-strip, and a movable cover for said opening adapted to be removed by the workman, means connected to and operated by the cover as it is being removed, for actuating the impression mechanism, whereby the workman can gain access to the recording-strip to write his name thereon only after first printing the time on the recording-strip opposite the place where his name is intended to be written, and means connected to and operated by the cover in its movement for feeding forward the paper strip.

3. In a workman's time-recorder, the combination of time-recording wheels, actuated by a clock-movement, impression mechanism for causing the time to be printed upon a recording-strip, a casing having an opening through which the workman can write upon the recording-strip, and a movable cover for said opening adapted to be removed by the workman to expose the opening, means connected to and operated by the cover as it is being raised for actuating the impression mechanism, whereby the workman can gain access to the recording-strip to write his name thereon only after first printing the time on the recording-strip opposite the place where his name is intended to be written, and means operated by the cover as it is being closed to feed the recording-strip and inking-ribbon.

4. In a workman's time-recorder, the combination of time-recording wheels, actuated by a clock-movement, impression mechanism for causing the time to be printed upon the recording-strip, a casing having an opening through which the workman can write upon the recording-strip, and a movable cover for said opening adapted to be removed by the workman to expose the opening, means connected to and operated by the cover as it is being raised for actuating the impression mechanism, whereby the workman can gain access to the recording-strip to write his name thereon only after first printing the time on the recording-strip opposite the place where his name is intended to be written, means operated by the cover as it is being closed to feed the recording-strip and inking-ribbon, and means for replacing the cover.

5. In a workman's time-recorder, the combination of time-recording wheels, actuated by a clock-movement, impression mechanism for causing the time to be printed upon a recording-strip, a casing having an opening through which the workman can write upon the recording-strip, a lid adapted to be raised by the workman to expose the opening, means connected to and operated by the lid, as it is being raised, for actuating the impression mechanism whereby the time will be printed upon the recording-strip as the lid is being raised, means automatically operated for closing the lid, and means connected to and operated by the lid as it is being closed, for feeding forward the paper strip, whereby the recording-strip will be in position for the next operation.

6. In a workman's time-recorder, the combination of means for feeding a recording-strip forward, time-recording wheels, actuated by a clock-movement, a carriage carrying the time-recording wheels and means operated by the workman to move the said carriage so as to bring the said wheels into contact with the recording-strip to cause an impression of the time to be made upon the strip, and a casing having an opening through which the workman can write upon the recording-strip.

7. In a workman's time-recorder, the combination of means for feeding a strip and ribbon forward, time-recording wheels, actuated by a clock-movement, a carriage carrying the time-recording wheels and means operated by the workman to move the said carriage so as to bring the said wheels into contact with the recording-strip to cause an impression of the time to be made upon the strip, and a casing having an opening through which the workman can write upon the recording-strip.

8. In a workman's time-recorder, the combination of means for feeding a recording-strip forward, time-recording wheels, actuated by a clock-movement, a carriage adapted at part of its movement to bring the recording-strip and time-recording wheels into contact to cause an impression of the time to be made upon the strip, springs connected with the carriage tending to force the carriage into position to effect the printing, a stop for holding the carriage normally away from the printing position, and means actuated by the workman for removing the stop, whereby the carriage will be released to effect the printing.

9. In a workman's time-recorder, the combination of means for feeding a recording-strip forward, time-recording wheels, actuated by a clock-movement, a carriage adapted at part of its movement to bring the recording-strip and time-recording wheels into contact to cause an impression of the time to be made upon the strip, springs connected with the carriage tending to force the carriage into position to effect the printing, a stop for holding the carriage normally away from the printing position, and means actuated by the workman for removing the stop, whereby the carriage will be released to effect the printing, and a casing having an opening through which the workman can write upon the recording-strip.

10. In a workman's time-recorder, the combination of time-recording wheels, actuated by a clock-movement, impression mechanism for causing the time to be printed upon the recording-strip, a carriage carrying the time-recording wheels, a casing having an opening through which the workman can write upon the recording-strip, and a cover for said opening adapted to be removed by the workman to expose the opening, means, connected to and operated by the cover as it is being removed, for moving the carriage and actuating the impression mechanism whereby the time will be printed upon the recording-strip while the cover is being removed, and means for returning the cover to its place.

11. In a workman's time-recorder, the combination of time-recording wheels, actuated by a clock-movement, impression mechanism for causing the time to be printed upon a recording-strip, a carriage carrying the time-recording wheels and also the recording-strip and inking-ribbon, a casing having an opening through which the workman can write upon the recording-strip, and a cover for said opening adapted to be removed by the workman to expose the opening, means, connected to and operated by the cover as it is being removed, for actuating the impression mechanism whereby the time will be printed upon the recording-strip while the cover is being removed, means for feeding forward the recording-strip connected to and operated by, the cover as it is being replaced, and means for replacing the cover.

12. In a workman's time-recorder, the combination of means for feeding a recording-strip and inking-ribbon forward, time-recording wheels actuated by a clock-movement, impression mechanism for causing the time to be printed upon the recording-strip, a carriage carrying the time-recording wheels adapted at part of its movement to bring the recording-strip and time-recording wheels into contact to cause an impression of the time to be made upon the strip, springs connected with the carriage tending to force the carriage into position to effect the printing, a stop for holding the carriage normally away from the printing position, a casing having an opening through which the workman can write upon the recording-strip, and a cover for said opening adapted to be removed by the workman to expose the opening and remove the stop, whereby the carriage will be released to effect the printing.

13. In a workman's time-recorder, the combination of time-recording wheels, actuated by a clock-movement, impression mechanism for causing the time to be printed upon a recording-strip, a carriage carrying the time-recording wheels adapted at part of its movement to bring the recording-strip and time-recording wheels into contact to cause an impression of the time to be made upon the strip, springs connected with the carriage tending to force the carriage into position to effect the printing, a stop for holding the carriage normally away from the printing position, a casing having an opening through which the workman can write upon the recording-strip, and a cover for said opening adapted to be removed by the workman to expose the opening and remove the stop, whereby the carriage will be released to effect the printing, means automatically operated for closing the lid, and means connected to and operated by the lid as it is being closed, for feeding forward the paper strip, whereby the recording-strip will be in position for the next operation.

14. In a workman's time-recorder, the combination of a casing having an opening through which the workman can write upon the recording-strip, a lid adapted to be raised by the workman to expose the opening, time-recording wheels actuated by a clock-movement, impression mechanism for causing the time to be printed upon a recording-strip, a carriage adapted at part of its movement to bring the recording-strip and time-recording wheels into contact to cause an impression of the time to be made upon the strip, springs connected with the carriage tending to force the carriage into position to effect the printing, a stop for holding the carriage normally away from the printing position, means connected to the stop and also connected to and operated by the lid as it is being raised for temporarily removing the stop while the lid is being raised in order to effect the printing and for restoring the stop to its operative position when the lid is fully raised, a second stop to hold the carriage away from the printing position and adapted to be brought into operative position by the lid before the first stop is removed from operative position on the closing of the lid, means for removing the second stop from operative position actuated by the lid near the end of its closing movement, and means for automatically closing the lid.

15. In a workman's time-recorder, the combination of a casing having an opening through which the workman can write upon the recording-strip, a lid adapted to be raised by the workman to expose the opening, time-recording wheels actuated by a clock-movement, impression mechanism for causing the time to be printed upon a recording-strip, a carriage adapted at part of its movement to bring the recording-strip and time-recording wheels into contact to cause an impression of the time to be made upon the strip, springs connected with the carriage tending to force the carriage into position to effect the printing, a cam-stop having two shoulders and an intermediate depression between the shoulders adapted normally to have one shoulder press upon the carriage and hold it away from the printing position, means connected to the stop and connected to and operated by the lid as the lid is moved, whereby upon the opening of the lid the shoulder of the cam-stop is first removed from operative position to permit the carriage to effect the printing, and the second shoulder is later brought into operative position to force the carriage away from the printing position, and upon the closing of the lid the second shoulder is removed from operative position and the first shoulder is later brought into operative position, a second stop to hold the carriage away from the printing position and adapted to be brought into operative position by the lid before the second shoulder is removed from its operative position on the return movement of the lid, whereby the carriage is held away from the printing position by the second stop during the closing of the lid, means for removing the second stop from operative position actuated by the lid near the return of its closing movement, and means for automatically closing the lid.

16. In a workman's time-recorder, the combination of claws for feeding a recording-strip forward, a rock-shaft to which the claws are secured, and means for rocking the rock-shaft as the time-recorder is operated, whereby the recording-strip will be fed forward at each operation of the machine.

17. In a workman's time-recorder, the combination of a reciprocating paper-feeding frame, a rock-shaft journaled therein, claws for feeding the recording-strip forward secured to the rock-shaft, and means for reciprocating the paper-feeding frame as the time-recorder is operated whereby the recording-strip will be fed forward at each operation of the machine.

18. In a workman's time-recorder, the combination of time-recording wheels, actuated by a clock-movement, impression mechanism for causing the time to be printed upon a recording-strip, a casing having an opening through which the workman can write upon the recording-strip, a lid adapted to be raised by the workman to expose the opening and to actuate the impression mechanism, a reciprocating paper-feeding frame, a rock-shaft journaled therein, claws for feeding the recording-strip forward secured to the rock-shaft, and means connected to the paper-feeding frame and connected to and operated by the lid as it is moved whereby the recording-strip will be fed forward at each operation of the machine.

19. In a workman's time-recorder, the combination of an hour-wheel, a spring-pressed locking-arm adapted normally to lock the hour-wheel and prevent its rotation, an oscillating arm driven by clock-movement and adapted to oscillate forward and backward each hour, a dog mounted thereon adapted when the oscillating arm moves in one direction to rigidly engage the locking-arm to unlock it and to engage the hour-wheel to move it one tooth, a spring to permit the dog to yield on its return movement so as not to interfere with the action of the locking-arm in locking the hour-wheel.

20. In a workman's time-recorder, the combination of an hour-wheel, a spring-pressed locking-arm adapted normally to lock the hour-wheel, an oscillating arm driven by clock-movement and adapted to oscillate backward and forward each hour, a dog mounted thereon, a shoulder upon said dog, a stop upon the oscillating arm, whereby, when the oscillating arm moves in one direction, the shoulder will unyieldingly engage the locking-arm to unlock the hour-wheel and will engage a tooth of the hour-wheel to rotate the latter one tooth, a spring secured to the dog to permit it to yield on the return of the oscillating arm so as not to interfere with the locking action of the locking-arm, whereby the hour-wheel will be fed forward one tooth each hour.

21. In a workman's time-recorder, the combination of an hour-wheel, a spring-pressed locking-arm adapted normally to lock the hour-wheel, an oscillating arm driven by clock-movement and adapted to oscillate forward and backward each hour, a dog mounted thereon, a shoulder upon said dog, a stop upon the oscillating arm, whereby, when the oscillating arm moves in one direction, the shoulder will unyieldingly engage the locking-arm to unlock the hour-wheel and will engage a tooth of the hour-wheel to rotate the latter one tooth, a spring secured to the dog to permit it to yield on the return of the oscillating arm so as not to interfere with the locking action of the locking-arm, a pin upon the oscillating arm adapted to engage a tooth on the hour-wheel immediately after the shoulder on the dog has fed forward the hour-wheel one tooth, whereby the hour-wheel will be fed forward one tooth only each hour.

22. In a workman's time-recorder, the combination of an hour-wheel, a spring-pressed locking-arm, a lug upon said arm adapted normally to lock the hour-wheel, a spring-pressed oscillating arm, a cam driven by clockwork and adapted to engage with and to oscillate the oscillating arm forward and backward once an hour, a dog mounted thereon, a shoulder upon said dog, a stop upon the oscillating arm whereby when the oscillating arm moves in one direction the shoulder will unyieldingly engage a pin upon the locking-arm to unlock the hour-wheel and will engage a tooth of the hour-wheel to rotate the latter one tooth, a spring secured to the dog to permit it to yield on the return of the oscillating arm so as not to interfere with the locking action of the locking-arm, a pin upon the oscillating arm adapted to engage a tooth on the hour-wheel immediately after the shoulder on the dog has fed forward the hour-wheel one tooth, whereby the hour-wheel will be fed forward one tooth only each hour.

In testimony whereof I have signed my name to this specification in the presence of two subscribing witnesses.

WILLARD LE GRAND BUNDY.

Witnesses:
A. WARD FORD,
J. W. CAPEN.